United States Patent
Crecelius et al.

(10) Patent No.: US 10,516,323 B2
(45) Date of Patent: Dec. 24, 2019

(54) SEGMENTED SWITCHED RELUCTANCE MOTOR FOR POWERTRAIN ELECTRIFICATION

(71) Applicant: AMERICAN AXLE & MANUFACTURING, INC., Detroit, MI (US)

(72) Inventors: David Crecelius, Cicero, IN (US); James P. Downs, South Lyons, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 441 days.

(21) Appl. No.: 15/285,217

(22) Filed: Oct. 4, 2016

(65) Prior Publication Data

US 2018/0097430 A1   Apr. 5, 2018

(51) Int. Cl.
| | |
|---|---|
| F16H 57/02 | (2012.01) |
| B60K 6/48 | (2007.10) |
| H02K 19/10 | (2006.01) |
| H02K 11/21 | (2016.01) |
| B60K 6/26 | (2007.10) |
| B60K 6/485 | (2007.10) |
| F02N 11/14 | (2006.01) |
| F16H 57/023 | (2012.01) |

(52) U.S. Cl.
CPC .......... *H02K 19/103* (2013.01); *B60K 6/26* (2013.01); *B60K 6/485* (2013.01); *F02N 11/14* (2013.01); *F16H 57/02* (2013.01); *H02K 11/21* (2016.01); *B60K 2006/264* (2013.01); *B60K 2006/268* (2013.01); *B60Y 2200/92* (2013.01); *B60Y 2400/60* (2013.01); *F16H 57/023* (2013.01); *F16H 2057/02034* (2013.01); *Y10S 903/906* (2013.01); *Y10S 903/952* (2013.01)

(58) Field of Classification Search
CPC ....... F16H 37/0806; F16H 2057/02034; B60K 2006/4816; B60K 2006/4825
USPC ......................................................... 74/661
See application file for complete search history.

(56) References Cited

U.S. PATENT DOCUMENTS

| | | | |
|---|---|---|---|
| 4,315,171 A | 2/1982 | Schaeffer | |
| 4,348,605 A | 9/1982 | Torok | |
| 4,958,095 A * | 9/1990 | Uchida | F02N 11/04 123/41.31 |
| 5,015,903 A | 5/1991 | Hancock et al. | |
| 6,441,506 B2 * | 8/2002 | Nakashima | B60K 6/365 123/179.1 |
| 7,174,979 B2 * | 2/2007 | Ohta | B60K 6/365 180/65.25 |

(Continued)

*Primary Examiner* — Ha Dinh Ho
(74) *Attorney, Agent, or Firm* — Harness, Dickey & Pierce, P.L.C.

(57) ABSTRACT

The present disclosure relates to a transmission system having a transmission subsystem, a transmission housing for housing the transmission subsystem, and a rotor operably associated with the transmission subsystem. The rotor has a weight and dimension to act as a flywheel. At least one stator pole segment is housed within the transmission housing and has at least one stator winding thereon positioned in proximity to a surface of the rotor. An inverter communicates with the stator winding and electrically energizes the winding to cause rotation of the rotor.

15 Claims, 3 Drawing Sheets

(56) References Cited

U.S. PATENT DOCUMENTS

| | | | |
|---|---|---|---|
| 7,622,875 B2* | 11/2009 | Atarashi | B60L 15/025 318/400.41 |
| 8,545,367 B2* | 10/2013 | Hartz | B60K 6/40 477/5 |
| 8,641,573 B2* | 2/2014 | Ideshio | B60K 6/365 475/218 |
| 9,132,834 B2* | 9/2015 | Ideshio | B60K 6/383 |
| 9,431,884 B2* | 8/2016 | Ramamoorthy | H02K 51/00 |
| 9,887,656 B2* | 2/2018 | Hijikata | H02K 51/00 |

* cited by examiner

SEGMENTED SWITCHED RELUCTANCE MOTOR FOR POWERTRAIN ELECTRIFICATION

FIELD

The present disclosure relates to powertrain systems for motor vehicles, and more particularly to a segmented, switched reluctance motor for forming an electrified powertrain for a motor vehicle, and which is able to be integrated into a conventional transmission housing of a transmission of the vehicle.

BACKGROUND

This section provides background information related to the present disclosure which is not necessarily prior art.

A traditional front wheel drive (FWD) vehicle often has a transverse mounted powertrain, which in the industry as identified as being in the "P2 location". As should be appreciated, space is at a premium in this location. As a result, when an engine, transmission, flywheel, and torque converter are located in the P2 location there is virtually no additional room for an electric motor. This is illustrated in FIG. 1 which shows a typical engine/transmission architecture where the transmission housing is axially aligned with the crankshaft of the engine. An independent electric motor is typically secured to, or adjacent to, the transmission housing, for cranking the engine during a starting operation. These components are further arranged transversely in the engine compartment of the vehicle. More specifically, the available transverse space in the P2 location simply does not permit adding a conventional electric motor between the engine and the transmission. As a result, a hybrid powertrain must incorporate the electric motor at some other location on the vehicle, which can also be challenging from a space availability standpoint. Locating the electric motor remotely from the other powertrain components also can complicate the design and/or layout of the vehicle's exhaust system. Still further, the use of a fully independent electric motor at some location other than the P2 location, and which is typically housed within its own housing, can add significant additional weight to the vehicle and/or alter the weight distribution of the vehicle.

Accordingly, there is a need for a hybrid powertrain construction that can be integrated into the P2 location without tangibly increasing the overall length of the powertrain.

SUMMARY

This section provides a general summary of the disclosure, and is not a comprehensive disclosure of its full scope or all of its features.

In one aspect the present disclosure relates to a transmission system comprising a transmission subsystem, a transmission housing for housing the transmission subsystem, and a rotor operably associated with the transmission subsystem. The rotor is supported for rotation within the transmission housing and has a weight and dimension to act as a flywheel. At least one stator pole segment is housed within the transmission housing, and has at least one stator winding thereon. The stator pole segment is secured to the transmission housing in a manner so that a portion thereof is in proximity to a surface of the rotor. An inverter is included which is in electrical communication with the stator winding of the stator pole segment. The inverter is configured to electrically energize the winding of the stator pole segment to cause rotation of the rotor.

In another aspect the present disclosure relates to a transmission system. The transmission system may have a transmission subsystem, a transmission housing having at least two openings, and a rotor operably coupled to the transmission subsystem. The rotor is supported for rotation within the transmission housing and has a weight and dimension to act as a flywheel. At least two independent stator pole segments are mounted within the plurality of openings. Each independent stator pole segment has a stator winding thereon, and the stator pole segments are spaced generally equidistantly circumferentially apart from one another, and secured to the transmission housing in a manner so that a portion of each stator pole segment is in proximity to a peripheral surface of the rotor. The independent stator pole segments collectively form a switched reluctance motor configured to power an engine coupled to the transmission subsystem.

In still another aspect the present disclosure relates to a method for forming a transmission. The method may comprise mounting a transmission subsystem within a transmission housing. The method may also involve coupling a rotor with the transmission subsystem and supporting the rotor for rotational movement within the transmission housing. The rotor may be configured to have a weight and dimensions to act as a flywheel. The method may also involve supporting a plurality of at least two independent stator pole segments, each having a stator winding thereon, and spaced generally equidistantly circumferentially apart from one another, at least partially within the transmission housing. The independent stator pole segments may also be supported in a manner so that a portion of each said independent stator pole segment is in proximity to a peripheral surface of the rotor. An inverter may be used which is in electrical communication with the stator windings of the independent stator pole segments, and configured to electrically energize the independent stator pole segments, to cause rotation of the rotor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
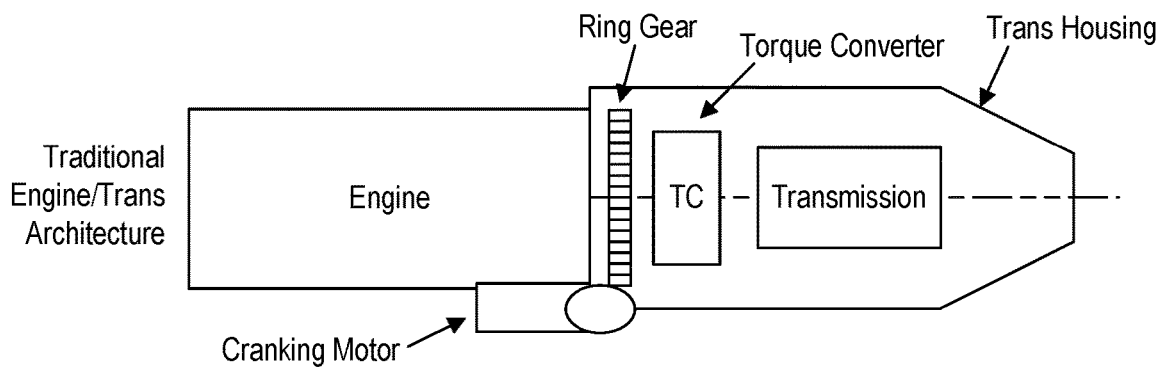
FIG. 1 is a high level block diagram illustration of a prior art powertrain layout in which the engine, ring gear, torque converter and transmission are arranged along a common axis.
Figure 2:
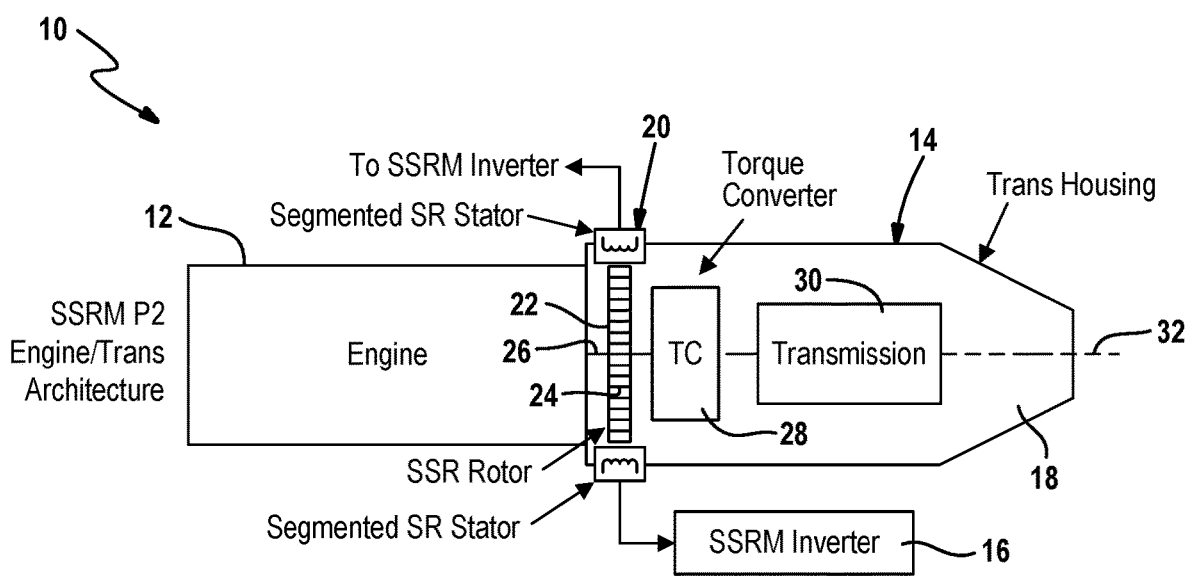
FIG. 2 is a high level block diagram of one embodiment of a hybrid powertrain system in accordance with the present disclosure, in which a switched reluctance motor is integrated into the transmission.
Figure 3:
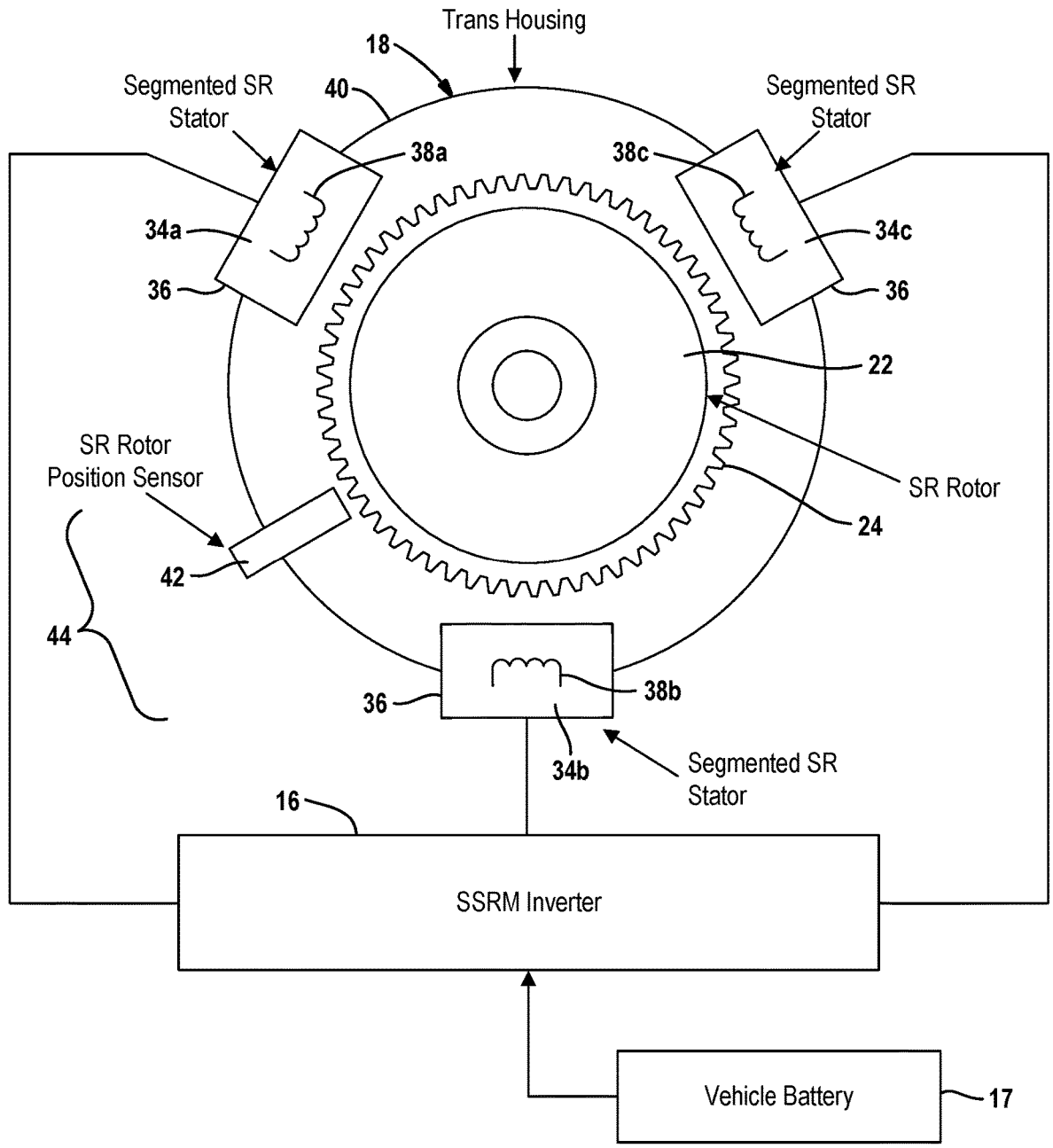
Figure 4:
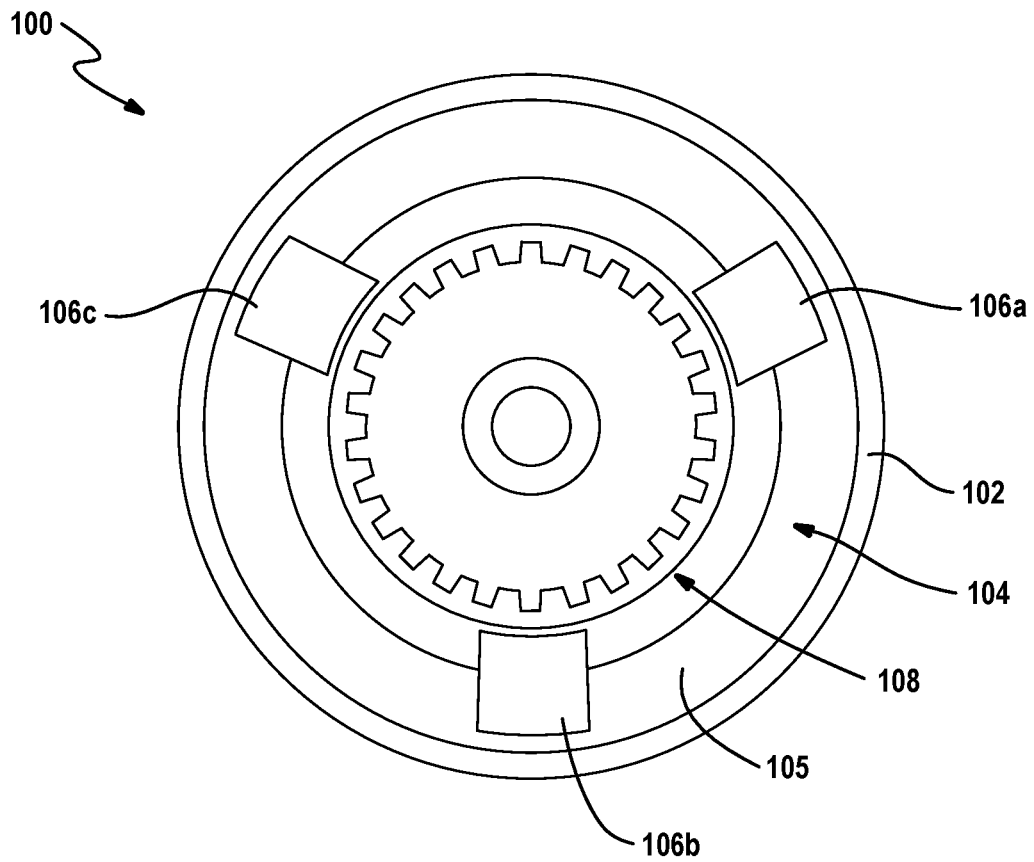

FIG. 3 is a block diagram end view of the transmission of FIG. 2, showing the switched reluctance motor integrated into the transmission, along with a block representation version of the inverter which is used to electronically control commutation of the switched reluctance motor; and FIG. 4 is a high level schematic diagram of another embodiment of the present disclosure in which a sleeve-like stator subsystem is contained entirely within a periphery of a transmission housing.

Corresponding reference numerals indicate corresponding parts throughout the several views of the drawings.

DETAILED DESCRIPTION

Example embodiments will now be described more fully with reference to the accompanying drawings.

Referring to FIG. 2, one embodiment of a hybrid powertrain 10 is shown in accordance with the present disclosure. The hybrid powertrain 10 (hereinafter simply "powertrain") 10 in this example includes an internal combustion engine 12, a transmission 14 and an electronic inverter 16. The inverter 16 receives DC power from a vehicle battery 17. The transmission 14 includes a housing 18 having an integrated, segmented stator system 20. Within the housing 18 is a rotor 22 having an optional gear 24 formed thereon or fixedly secured thereto. The rotor 22 has a diameter and a weight which is sufficient to enable the rotor 22 to act as a flywheel. The rotor 22 is fixedly secured to an input shaft 26 which is in turn operably coupled to the crankshaft (not shown) of the engine 12. Also operably coupled to the input shaft 26 is a torque converter 28 and a transmission subsystem 30. An output shaft 32 of the transmission subsystem 30 is used to drive at least a pair of wheels of the vehicle with which the powertrain 10 is being used.

A principal advantage of the system 10 is the integrated, segmented stator system 20 (hereinafter simply "stator system" 20). The stator system 20 is able to be integrated into transmission 14 without increasing the overall axial length of the powertrain 10, which is especially important when the powertrain is located in the P2 location of the vehicle, where and space is very limited. With further reference to FIG. 3, the stator system 20 includes a plurality of independently formed stator pole segments 34a-34c which are mounted in suitable sized openings 36 in the transmission housing 18. In this example three stator pole segments 34a-34c are used to form a stator, although it will be appreciated that a greater number of stator pole segments could be used if desired. At least one pole segment will be required, but two or more pole segments are expected to be more preferable to eliminate any undesirable radial loading onto the main bearing(s) (not shown) supporting the rotor 22.

The stator pole segments 34a-34c are spaced equidistantly around the transmission housing 18 and each include includes a coil winding assembly 38a-38c thereon. Thus, a plurality of coil windings make up coil winding assembly 38a, a separate plurality of coil windings make up coil winding assembly 38b and still another separate plurality of coil windings make up coil winding assembly 38c. The stator pole segments 34a-34c are shown projecting slightly outwardly from an outer surface 40 of the transmission housing 18, although depending on the size of the transmission housing, the stator pole segments could be contained entirely within the transmission housing 18. The stator pole segments 34a-34c are positioned such that a small axial air gap is present between radially inward surfaces of each stator pole segment and an outer surface of the gear 24 on the outer perimeter edge of the rotor 22. However, depending on the electromagnetic design requirements, the gap could comprise a radial gap, or possibly even a combination of axial and radial gaps.

As noted above, the equidistant spacing of the stator pole segments 34a-34c around the rotor 22 is preferred because it also eliminates the possibility of creating an unbalanced force vector on the bearing(s) (not shown) supporting the rotor 22 on the input shaft 26. A segmented rotor position sensor 42 is positioned closely adjacent the rotor 22 to detect an angular position of the rotor in real time and to supply an electrical angular position signal to the inverter 16, as is otherwise well known for commutating switched reluctance motors. The stator system 20 with its stator pole segments 34a-34c, the inverter subsystem 16 and the rotor position sensor 42 cooperatively form a switched reluctance motor 44.

It will also be understood that the rotor 22 forms a salient pole component, as is standard with any switched reluctance motor. To commutate the switched reluctance motor 44, selected pairs of the stator coils in each pole segment 34a-34c are energized at a time by the inverter 16 to pull the rotor 22 into alignment with the energized stator coil pole segments, as is well understood in the art. The inverter 16 operates in a closed loop fashion using the feedback signals from the rotor position sensor 42, which is detecting the presence of one or more elements (not shown) on the rotor 22, and detected currents in the coil winding assemblies 38a-38c, to determine which pair of the stator coil-pole segments 34a-34c need to be energized to maintain rotational motion of the rotor 22. The complexity of the inverter 16 will increase as the number of stator coils and pole segments 34 increases.

A particular advantage of the system 10 is that the rotor 22 has a relatively large diameter and a weight that is similar or identical to that of a conventional flywheel typically used with automotive transmissions. This enables the motor 44 to provide higher torque values to the engine's crankshaft, which is advantageous when using the switched reluctance motor 44 to start the engine 12. The torque seen at the engine's 12 crankshaft will largely be a function of the rotor 22 diameter and the electromagnetic force created in the stator system 20.

In the embodiment shown in FIGS. 2 and 3, the stator pole segments 34a-34c overlay corresponding openings 36 in the transmission housing 18 so that the stator pole segments 34a-34c can project through into the interior area of the housing in close proximity to the surface of the gear 24 of the rotor 22. Alternatively, the stator segments 34a-34c may be supported from independent frame-like members positioned closely adjacent the outer surface 40 of the transmission housing 18, which would allow the stator pole segments 34a-34c to project through openings in the transmission housing.

It will also be appreciated that packaging of the stator system 20 may be accomplished in a plurality of ways depending upon the specific application and the space available where the stator system is being used, as well as the torque output required. For example, FIG. 4 shows a transmission system 100 having a stator subsystem 104 which is contained entirely within a transmission housing 102. The stator subsystem 104 in this example includes a ring-like frame portion 105 which at least partially houses three stator pole segments 106a-106c spaced angularly equidistantly from one another. The stator pole segments 106a-106c may be identical in construction to the stator pole segments 34a-34c or they may differ slightly in the construction details if desired. The stator pole segments 106a-106c extend into close proximity with a rotor 108, although the precise spacing from the rotor 108 will depend on specific design requirements.

The powertrain 10 thus enables the switched reluctance motor 44 to be integrated into the P2 location between an engine and an otherwise conventional transmission, without increasing the overall axial length of the engine/transmission combination. This enables powertrain 10 to be used with transverse mounted engines where even a slight increase in axial length of the engine/transmission combination may not be possible because of space restrictions and interference from suspension and/or chassis components of the vehicle. As such, the powertrain 10 enables electrification of a vehicle powertrain in applications where the integration of a self-contained electric motor into the powertrain would not be feasible because of space constraints.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A transmission system for use with an internal combustion engine, the transmission system comprising:
    a transmission subsystem;
    a transmission housing for housing the transmission subsystem;
    a rotor operably associated with the transmission subsystem and with a crankshaft of the engine, and supported for rotation within the transmission housing, and being of a weight and dimension to act as a flywheel for the engine;
    at least two stator pole segments, each of the stator pole segments having at least one stator winding thereon, and the stator pole segments being circumferentially spaced apart from one another and secured to the transmission housing in a manner so that a portion of each said stator pole segment is in proximity to a surface of the rotor, and such that the stator pole segments are positioned radially outwardly of a radially outermost portion of the rotor;
    an inverter in electrical communication with the stator winding of each of the stator pole segments, and configured to selectively, electrically energize the independent stator pole segments to cause rotation of the rotor.

2. The transmission system of claim 1, wherein the system includes at least three independent stator pole segments spaced equidistantly circumferentially from one another.

3. The transmission system of claim 1, further comprising a torque converter.

4. The transmission system of claim 1, wherein the stator pole segment protrudes partially outwardly from an exterior surface of the transmission housing.

5. The transmission of claim 1, further including an engine operably coupled to the transmission subsystem to form a hybrid powertrain.

6. The transmission of claim 1, wherein the rotor includes a ring gear.

7. The transmission of claim 1, further comprising a rotor position sensor disposed adjacent the periphery of the rotor for detecting an angular position of the rotor and communicating an angular position signal to the inverter.

8. A transmission system for use with an internal combustion engine, the transmission system comprising:
    a transmission subsystem;
    a transmission housing having at least two openings;
    a rotor operably coupled to the transmission subsystem and supported for rotation within the transmission housing, and being of a weight and dimension to act as a flywheel for the internal combustion engine; and
    a plurality of at least two independent stator pole segments mounted within the plurality of openings, each said independent stator pole segment having at least one stator winding thereon, and each being spaced generally equidistantly circumferentially apart from one another, and secured to the transmission housing in a manner to be positioned radially outward of a radially outermost portion of the rotor, and so that a portion of each said stator pole segment is in proximity to the radially outermost portion of the rotor; and
    the independent stator pole segments collectively forming a switched reluctance motor configured to at least one of power an engine or to crank the engine, wherein the engine is coupled to the transmission subsystem.

9. The transmission of claim 8, further comprising an inverter in electrical communication with each said stator winding of the independent stator pole segments, and being configured to electrically energize the stator windings to cause rotation of the rotor.

10. The transmission of claim 8, wherein three of said independent stator pole segments are mounted within three of the openings in the transmission housing, and spaced equidistantly circumferentially apart.

11. The transmission of claim 8, further comprising a torque converter operably coupled to the transmission subsystem.

12. The transmission of claim 9, further comprising a rotor position sensor positioned adjacent to the rotor for detecting an angular rotational position of the rotor and providing a real time electrical angular position signal to the inverter.

13. The transmission of claim 12, wherein the rotor position sensor is mounted within an additional opening in the transmission housing.

14. The transmission of claim 8, further comprising a ring gear coupled to an outer periphery of the rotor.

15. The transmission of claim 8, wherein the independent stator pole segments, the rotor and the inverter cooperatively form a switched reluctance motor.

* * * * *